Patented May 4, 1943

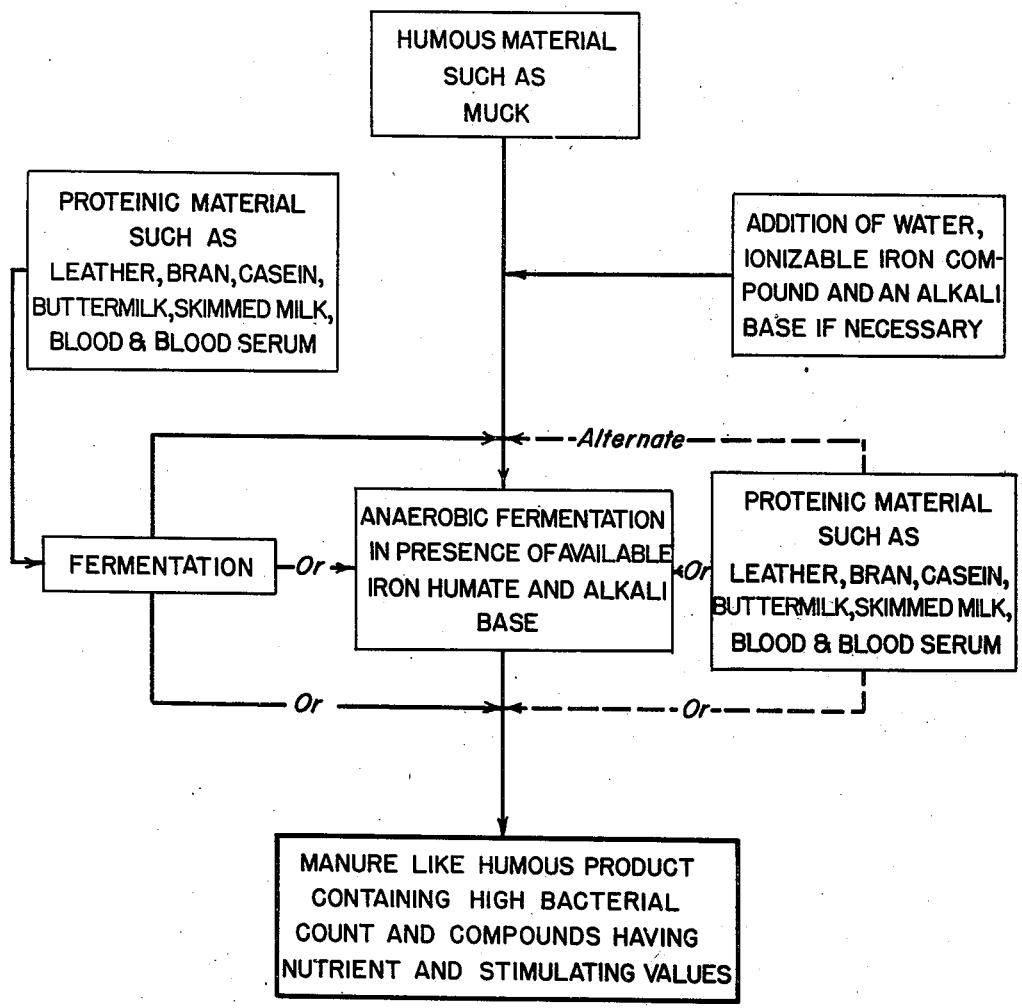

2,317,991

UNITED STATES PATENT OFFICE 2,317,991

PROMOTER, METHOD, AND PRODUCT

Ernest F. Grether, Midland, Mich., assignor to The Dow Chemical Company, Midland, Mich., a corporation of Michigan Application March 18, 1940, Serial No. 324,698

2 Claims. (Cl. 71—10)

This invention relates to a method of fermenting a humous material, and more especially to a method of fermenting humous material in the presence of a nitrogenous substance and the resulting product. This application is a continuation in part of my applications Serial No. 152,821, filed July 9, 1937, and Serial No. 241,707, filed November 21, 1938.

An object of my invention is to provide a product containing a plant stimulant and plant nutrients by subjecting a humous material to an anaerobic fermentation in the presence of an added quantity of an organic nitrogenous material.

Another object of my invention is to provide a method of anaerobically fermenting a humous material in the presence of an added quantity of an organic nitrogenous substance so as to produce an end product containing a plant stimulant and plant nutrients.

Yet another object of my invention is to provide a method of anaerobically fermenting a humous material in the presence of an added quantity of a proteinic material so as to produce an end product containing a plant stimulant and plant nutrients.

A further object of my invention is to provide a method of anaerobically fermenting a humous material in the presence of an added quantity of a proteinic material which has undergone a previous fermentation so as to produce an end product containing a plant stimulant and plant nutrients.

With these and other objects in view, my invention embraces broadly the concept of adding a nitrogenous material to the process disclosed in my co-pending application which is entitled "Process of treating a humous material and resulting product," which was filed May 10, 1939, and given Serial No. 272,896.

In this application I disclose a method of anaerobically fermenting a humous material, such as peat or peat muck, by means of which a product is obtained having manure-like properties and containing plant stimulants, plant nutrients, and a greatly increased bacterial count. In this process the humous material is subjected to an anaerobic fermentation after an alkali base and an iron compound have been added.

Although the process disclosed above causes the formation of a plant stimulant within the humous material and produces an end product having a manure-like odor and containing available plant nutrients, a high bacterial count, and other manure-like characteristics, I have found that this reaction can be strengthened and the manure-like odor noticeably increased by adding a nitrogenous material to the humous material. This nitrogenous material is preferably in the form of a protein. Among the proteinic materials which may be employed are bran, leather, casein, buttermilk, skimmed milk, blood, blood serum, or various types of industrial waste materials, or any mixtures of these substances.

I have found that casein and buttermilk are especially suitable for use in this process. Moreover, if the selected substance is subjected to a fermentation before being added to the humous material, the reaction is increased.

The selected proteinic material may be added before, during or after the anaerobic fermentation of the humous material, or at two or more of these stages of the process. The protein acts as a bacterial food.

The single sheet of drawings discloses a flow sheet illustrative of one form of my process.

As disclosed in the method illustrated in the drawing, a naturally occurring humous material, such as muck, lignite, leaf mold or compost cellulosic material such as decayed straw, is used in my process as distinguished from raw cellulosic material such as cornstalks. While my process may be adapted for use with any of the humous materials mentioned above, for purposes of illustration I will disclose the process as adapted to the use of muck as a starting material.

In practicing my invention, a quantity of water, unless the selected material contains sufficient water, is added until the humous material is in the form of a paste. To this starting material an iron compound and an alkali base or a mixture of alkali bases are added.

Ordinarily, the iron compound is added before the alkali base, although both of these substances may be added together or the order may be reversed if desired. If a sufficient quantity of the iron compound or alkali base is present for the purposes of the process, additional amounts need not be added. Usually, both the iron compound and the base are added in the form of an aqueous solution.

At this point the proteinic material, such as casein or buttermilk, may be added. However, as previously mentioned, this substance may be added during or after the anaerobic fermentation or during two or more of these stages of the process.

The quantity of water which is added to the humous material varies with the moisture content of the original starting material and also with the amount of water added in the iron compound and alkali base solutions and the moisture content of the proteinic material. Sufficient water, however, is added to produce a mixture in the form of a liquid paste-like mass. I have found that ordinarily, in order to obtain this liquid in paste-like form, the moisture content must be at least 70 percent by weight of the dry content of the original humous material. After this paste-like form has been obtained, the material is ready to be subjected to an anaerobic fermentation.

The iron compounds employed may be either of a soluble or insoluble type. Among these substances may be mentioned ferric and ferrous oxide and hydroxide, ferric and ferrous sulfate, ferric chloride, ferrous ammonium sulfate, iron acetate or citrate, or a mixture of these or similar compounds. The quantity of iron compound added varies widely with the quantity of iron present in the original starting material and in the type of material selected. Some naturally occurring humous material, such as muck, contains a quantity of iron, usually in insoluble form, but this material is ordinarily in insufficient quantities to practice my process. However, if a sufficient quantity of an iron compound is present, no additional iron is necessary.

In practice, when an average type muck is employed, the quantity of additional iron necessary varies from 0.01 to 0.5 gram molecule of iron per kilogram of dry humous material. Preferably, the iron is added in the form of an aqueous solution the concentration of which depends upon the physical condition of the starting material to which it is added.

Among the alkali bases which may be employed are included the hydroxides or carbonates of potassium, sodium or ammonia, or a mixture of these bases. The compounds containing potassium and ammonia are preferrd because of their plant nutrient properties.

A sufficient quantity of a selected alkali is added to the humous material to cause a hydrogen ion concentration in the resulting mixture of from 7 to 10 and preferably between 8 and 9. This pH value should be carefully regulated so that a complete conversion of the starting material can be obtained. The applicant has found that the iron humate in humous material becomes available and stabilized only when an alkali is present and the alkali also apparently releases some of the compounds, such as protein, which are present in the humous material.

After a sufficient quantity of an alkali base has been added to the humous material to form the soluble iron humate and to produce a hydrogen ion concentration of from 7 to 10, the resulting mixture is subjected to an anaerobic fermentation of from a few days to three months duration at room temperature or at a temperature which is regulated at any desired point within the range of 15 to 30° C. If temperatures above 40° C. are employed, the desired increase in bacterial growth of the type desired cannot be obtained.

In this application, by the term "anaerobic fermentation" is meant a fermentation which is truly anaerobic as distinguished from the aerobic-anaerobic fermentations usually disclosed in the prior art. The practical way of producing true anaerobic conditions is to reduce the humous material to a paste-like or liquid-paste mass which will exclude, due to the consistency of the material, the penetration of the atmosphere into the interior of the mixture during fermentation. This type of fermentation is entirely different from the fermentation of a humous material having a lower moisture content.

In the preferred form of my process, a nitrogenous material in the form of a protein, such as bran, leather, casein, buttermilk, skimmed milk, blood, blood serum, or various types of proteinic industrial waste materials, or a mixture of these substances, is added to the humous material before fermentation. A substance of this type initiates the fermentation and serves as a bacterial food which supports an increase in the bacteria present in the humous material. In addition to this indirect action of effecting the increase in the quantity of plant stimulant and plant nutrients within the end product by increasing the bacterial count during the fermentation, the presence of the proteinic material appears to directly effect the creation of the desired substance in the end product due to its presence in combination with the available iron humate and the alkali base during the fermentation. This direct effect results in a marked increase in the manure-like odor when a protein is used over the process when a protein is not added. In this connection experiments have shown that the intensity of the manure-like odor is not directly proportional to the increase in the number of bacteria.

If it is desired to prolong the fermentation, the proteinic material may be added during the fermentation or after it has been completed. If the process of fermentation has been completed before the proteinic addition, fermentation will start anew, and a further addition will again initiate a further fermentation.

As previously mentioned, casein and buttermilk are especially suitable for use with my process. Moreover, if these materials or any of the other proteinic raw materials previously mentioned, or substances of this general type, or in short, any protein which can be subjected in a liquid, moist, or wet state to bacterial fermentation in any manner or which ferments by itself by standing at ordinary or raised temperatures is fermented before it is added to the humous material, its effectiveness is greatly increased.

If this process is applied to buttermilk, the pre-fermentation (lactobacter) occurs simply by subjecting the material for several days to a suitable temperature, above room temperature. This method may also be followed in treating milk or skimmed milk. The fermentation of some proteinic substances, however, requires elevated temperatures and/or inoculation with suitable bacteria to produce maximum results. Plants treated with anaerobically fermented humous materials, which has been prepared by adding pre-fermented proteinic substances, show a marked increase in growth over plants treated under similar conditions with similar materials which were prepared with proteinic materials which had not been previously fermented.

Although the increase in the bacterial count will vary widely depending on the humous material selected and the length of the period of fermentation, actual experiments have shown that, although the live bacterial count per dry gram of humous material, after being subjected to the anaerobic fermentation, increased from six million to six hundred million, and the addition of fresh buttermilk before fermentation has increased this count to approximately one billion, the use of pre-fermented buttermilk has resulted in an increase to twenty-seven billion per gram of fermented humous material having a dry content of approximately 30 percent. Among the proteinic materials which may be readily subjected to a pre-fermentation may be listed skimmed milk, buttermilk, casein, blood, and blood serum.

The quantity of nitrogenous material added to the humous material depends on the type of end product desired and whether the substance is to be added only once or at several stages of the fermentation. Ordinarily, the total amount of protein added varies from 1 to 30 percent by weight of the total amount of humous material.

The applicant has never been able to ascertain the exact type of bacteria which is developed in his process. As the humous material is inoculated by bacteria in the air, it is believed that the development of a soil type of bacteria is favored by the process. Of course, many types of bacteria are present at first, but the condition of the humous material produced by the process is such that the desired type or types of bacteria multiply at the expense of those not desirable and therefore the desired end product is obtained.

During the fermentation the humous material develops a distinct manure-like odor which usually is most pronounced after a fermentation of three weeks in distinction to the bacterial count which reaches a peak during the first week of the fermentation. Moreover, the end product is found to be at least as active if the fermentation is continued for from two to three months.

Apparently the bacterial action breaks up the organic material, especially the nitrogenous materials, and converts them into products of a nature similar to that produced by intestinal digestion and the following manure fermentation. The manure-like odor is characteristic of the fermentation and is entirely unlike the putrefactive odor usually associated with the fermentation of organic materials and protein. Rather, it resembles the odor of manure, especially the odor of stored liquid manure.

It is believed that this odor is due to the presence among others of ammonium sulfide and indole derivatives just as in manure. The presence of available iron humate and an added quantity of a nitrogenous substance produces the stimulant and food content of the processed material. The action of these stimulants increases the appetite of the growing plants which results in a larger consumption of mineral elements and carbon dioxide by the plants.

While the bacteria contained within the humous material is believed to be partly responsible for this plant stimulating action, because their presence renders the soil minerals more available, it is also believed that other stimulations are released. In addition to this stimulating action, the end product is a fertilizer because it contains available plant nutrients.

The end product of the process is a dark brown paste which may be stored or applied directly to the land. It is a heavy, dense and imporous substance. If desired, this substance may be mixed with a filler, such as disclosed in my co-pending application Serial No. 204,475 which was filed April 26, 1938. Preferably, this filler is a dried portion of some of the humous material employed as a starting material in the process. However, a material such as dried peat or any other cellulosic material having water absorption powers may be used if desired.

Although for purposes of illustration I have described my process as adapted to the treatment of a naturally occurring humous material, such as muck, it is apparent that any type of humous material may be used in this process. The material may be acidic, neutral, or alkaline in character, as previously mentioned, but if it contains an appreciable amount of an alkaline earth metal compound, especially those containing the calcium ion, it must first be treated by the process outlined in my co-pending application Serial No. 324,850 filed March 19, 1940.

Although I have described one method of practicing my invention, it is apparent that the concept is of much broader scope, and I therefore intend that this application be limited only by the prior art and the scope of the appended claims.

I claim:

1. A process of producing a plant stimulant, plant nutrients, and an increased bacterial count within a humous material, comprising adding an iron compound to a humous material containing a moisture content of at least 70 percent, adding a sufficient quantity of an alkali base selected from the class consisting of the hydroxides and carbonates of potassium, sodium and ammonia to the said material to dissolve the iron compound and cause the mixture to have a pH value above 7, adding a sufficient quantity of a proteinic material to form from 1 to 10 percent by weight of the total mixture, and subjecting the resulting mixture to fermentation under substantially anaerobic conditions within a temperature range of from 15–30° C.

2. A process of producing a plant stimulant, plant nutrients, and an increased bacterial count within a humous material, comprising adding an iron compound to a humous material containing a moisture content of at least 70 percent, adding a sufficient quantity of an alkali base selected from the class consisting of the hydroxides and carbonates of potassium, sodium and ammonia to the said material to dissolve the iron compound and cause the mixture to have a pH value above 7, adding a sufficient quantity of a pre-fermented protein to form from 1 to 10 percent by weight of the total mixture, and subjecting the resulting mixture to fermentation under substantially anaerobic conditions within a temperature range of from 15–30° C.

ERNEST F. GRETHER.